UNITED STATES PATENT OFFICE.

JOHN W. HOPKINS, OF FAYETTEVILLE, NORTH CAROLINA.

IMPROVEMENT IN ARTIFICIAL STONE.

Specification forming part of Letters Patent No. 126,297, dated April 30, 1872.

*To all whom it may concern:*

Be it known that I, JOHN W. HOPKINS, of Fayetteville, in the county of Cumberland and State of North Carolina, have invented a new and Improved Composition Stone; and I do hereby declare the following to be a full, clear, and exact description of the same.

This invention relates to an artificial stone made under pressure in the usual manner. The elements of which this stone is composed are common sand and rosin, the first in the proportion of from sixty to ninety parts, by measure, to the hundred, and the rosin in the proportion of from ten to forty parts. These materials when thoroughly mixed, the rosin being of course in a melted state, and pressed and dried in the ordinary manner of manufacturing artificial stone, constitute a durable article of an agreeable dark-brown color, and very cheap. The sand forms the body of the artificial stone, the rosin serving to hold it together.

I do not claim to be the first to use sand and rosin in the manufacture of artificial stone, but the first to discover by experiment that sand and rosin alone are superior to a combination of them with other materials, such as cotton-seed, ashes, or other oil-yielding substance, as described in the patent of W. H. Poindexter, July 4, 1854.

Hence I claim as of my invention—

An artificial stone composed of rosin and sand, in the proportions specified.

JOHN W. HOPKINS.

Witnesses:
C. W. BROADFOOT,
A. OVERBAUGH.